(12) United States Patent
Maeda (10) Patent No.: US 10,794,261 B2
(45) Date of Patent: Oct. 6, 2020

(54) COOLING MODULE (71) Applicant: DENSO CORPORATION, Kariya, Aichi-pref. (JP)

(72) Inventor: Akihiro Maeda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/352,109

(22) Filed: Mar. 13, 2019

(65) Prior Publication Data
US 2019/0211739 A1  Jul. 11, 2019

Related U.S. Application Data (63) Continuation of application No. PCT/JP2017/029120, filed on Aug. 10, 2017.

(30) Foreign Application Priority Data

Sep. 22, 2016  (JP) .................. 2016-184938

(51) Int. Cl.
*F01P 7/04* (2006.01)
*B60K 11/08* (2006.01)
*B60K 11/06* (2006.01)
*F01P 1/06* (2006.01)
*B60K 11/04* (2006.01)

(52) U.S. Cl.
CPC .............. *F01P 7/04* (2013.01); *B60K 11/04* (2013.01); *B60K 11/06* (2013.01); *B60K 11/085* (2013.01); *F01P 1/06* (2013.01)

(58) Field of Classification Search
CPC ....... B60K 11/085; B60K 11/04; B60K 11/06; B60K 11/08; F01P 1/06; F01P 3/12; F01P 5/06; F01P 1/00; F01P 2001/005
See application file for complete search history.

(56) References Cited

U.S. PATENT DOCUMENTS

| 4,476,820 A | * | 10/1984 | Nixon | ................. | B60K 11/00 |
| | | | | | 123/195 C |
| 2004/0226764 A1 | * | 11/2004 | Iwasaki | ................. | F28F 9/002 |
| | | | | | 180/68.1 |
| 2011/0132292 A1 | * | 6/2011 | Schwartz | ............... | F01P 7/048 |
| | | | | | 123/41.12 |

(Continued)

FOREIGN PATENT DOCUMENTS

| JP | H05169986 A | 7/1993 |
| JP | 2003083046 A | 3/2003 |
| JP | 2016109114 A | 6/2016 |

*Primary Examiner* — Long T Tran
(74) *Attorney, Agent, or Firm* — Harness, Dickey & Pierce, P.L.C.

(57) ABSTRACT

A cooling module applied to a vehicle having a blower arranged on a front side in a vehicle traveling direction with respect to a driving engine in a front engine compartment includes a duct having a first opening portion and a second opening portion so as to flow air flow between the first opening portion and the second opening portion. The first opening opens to the front side in the vehicle traveling direction and the second opening opens toward an object to be cooled other than the driving engine in the front engine compartment. In the duct, the air flow blown out from the blower is pushed into the first opening portion and the pushed air flow is blown out from the second opening portion to the object to be cooled.

10 Claims, 7 Drawing Sheets

(56) References Cited

U.S. PATENT DOCUMENTS

| | | | |
|---|---|---|---|
| 2014/0251239 A1* | 9/2014 | Richards | F02B 29/0468 |
| | | | 123/41.05 |
| 2014/0299077 A1* | 10/2014 | Sowards | B60K 11/085 |
| | | | 123/41.05 |
| 2016/0090899 A1* | 3/2016 | Hayes | F02B 29/0431 |
| | | | 165/51 |
| 2016/0368366 A1* | 12/2016 | Miller | B60K 11/085 |
| 2017/0120743 A1* | 5/2017 | Dudar | B60K 11/085 |
| 2018/0086198 A1* | 3/2018 | Maeda | B60K 11/06 |
| 2018/0259240 A1* | 9/2018 | Onishi | F25D 21/006 |

* cited by examiner

FRONT ←——→ REAR
VEHICLE TRAVELING DIRECTION

COOLING MODULE

CROSS REFERENCE TO RELATED APPLICATIONS

The present application is a continuation application of International Patent Application No. PCT/JP2017/029120 filed on Aug. 10, 2017, which designated the United States and claims the benefit of priority of Japanese Patent Application No. 2016-184938 filed on Sep. 22, 2016. The entire disclosure of all of the above applications is incorporated herein by reference.

TECHNICAL FIELD

The present disclosure relates to a cooling module.

BACKGROUND

Conventionally, in a front engine compartment, a cooling module is applied to a vehicle in which an exhaust manifold is disposed on a front side in a vehicle traveling direction with respect to a driving engine, and cools the exhaust manifold by air flow.

SUMMARY

It is an object of the present disclosure to provide the cooling module that efficiently cools an object to be cooled in the front engine compartment.

According to one aspect of the present disclosure, a cooling module applied to a vehicle having a blower disposed in front side of a driving engine in a vehicle traveling direction in a front engine compartment, comprises a duct having a first opening portion and a second opening portion so as to form an air flow between the first opening portion and the second opening portion, wherein the first opening portion opens to the front side in the vehicle traveling direction with respect to the driving engine in the front engine compartment and the second opening portion opens to an object to be cooled in the front engine compartment other than the driving engine, and wherein in the duct the air flow blown out from the blower after being pushed into the first opening portion and the pushed air flow is blown out from the second opening portion to the object to be cooled.

DETAILED DESCRIPTION

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

First Embodiment

Figure 1:
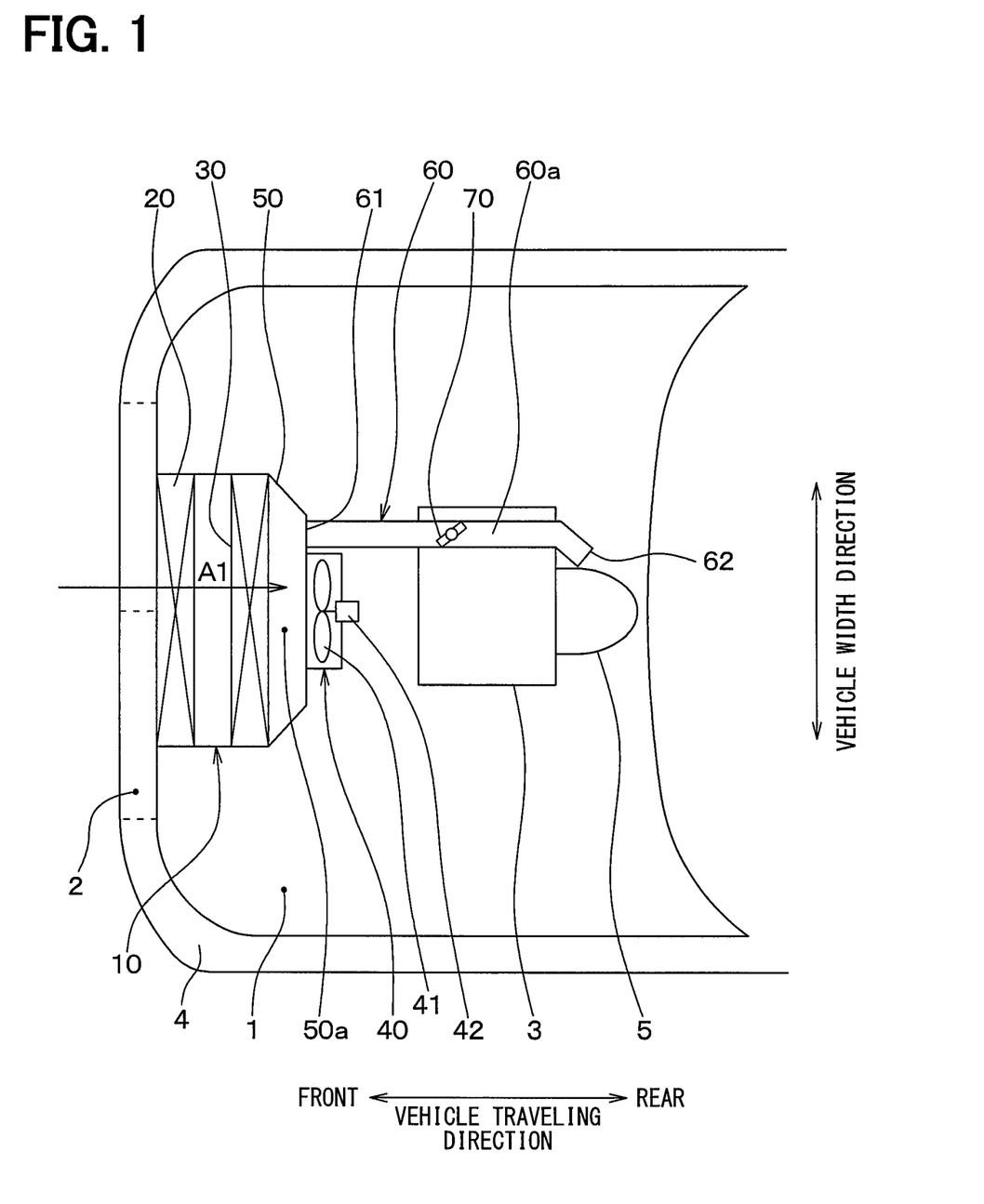
FIG. 1 is a schematic view of the entire configuration of a cooling module as viewed from above in a circumferential direction in a first embodiment.

FIG. 1 shows a first embodiment of a cooling module 10 for a vehicle in the present disclosure.

The cooling module 10 of the present embodiment is disposed between the front grille opening portion 2 and the driving engine 3 in the front engine compartment 1 of the vehicle. The front grille opening portion 2 is an opening that opens from the front engine compartment 1 toward the front of the front grille 4 in the vehicle traveling direction in the front grille 4 of the vehicle. The front engine compartment 1 is a space in which a driving engine 3 is mounted, and is placed on the front side in the vehicle traveling direction with respect to the passenger compartment in the vehicle.

Specifically, as shown in FIG. 1, the cooling module 10 includes a condenser 20, a radiator 30, an electric fan 40, a shroud 50, a duct 60, and a valve 70.

The condenser 20 is disposed on the rear side in the vehicle traveling direction with respect to the front grille opening portion 2. The condenser 20 constitutes a refrigeration cycle apparatus for air conditioner that circulates the refrigerant, together with a compressor, a pressure reducing valve, and an evaporator, and is a heat exchanger in which the high pressure refrigerant discharged from the compressor is cooled by air outside the passenger compartment (hereinafter referred to as outside air).

The radiator 30 is disposed on the rear side in the vehicle traveling direction with respect to the condenser 20. The radiator 30 is a heat exchanger that cools the cooling water of the driving engine 3 by outside air. The radiator 30 is disposed on the upstream side in the air flow direction in the introduction flow passage 50a with respect to the electric fan 40. The introduction flow passage 50a is an air passage for introducing the air flow sucked from the outside of the vehicle through the front grille opening portion 2 to the electric fan 40 through the condenser 20 and the radiator 30 as indicated by the arrow A1 in FIG. 1. The air flow direction in the introduction flow passage 50a is the flow direction of the main flow having the largest air volume among the plurality of air flows flowing through the introduction flow passage 50a.

The electric fan 40 is a blower disposed on the rear side in the vehicle traveling direction with respect to the radiator 30 in the front engine compartment 1. The electric fan 40 is composed of a fan 41 and an electric motor 42 as a drive unit for rotating the fan 41. The electric fan 40 generates an air flow that passes through the condenser 12 and the radiator 11 through the front grille opening portion 2 from the front of the vehicle in the vehicle traveling direction.

The shroud 50 is a casing that forms the introduction flow passage 50a for guiding the air flow sucked from the front grille opening portion 2 to the electric fan 40 through the condenser 20 and the radiator 30. The shroud 50 is formed so as to close the gap between the condenser 20 and the radiator 30 and between the radiator 30 and the electric fan 40 from a vehicle width direction and a circumferential direction.

Figure 2:
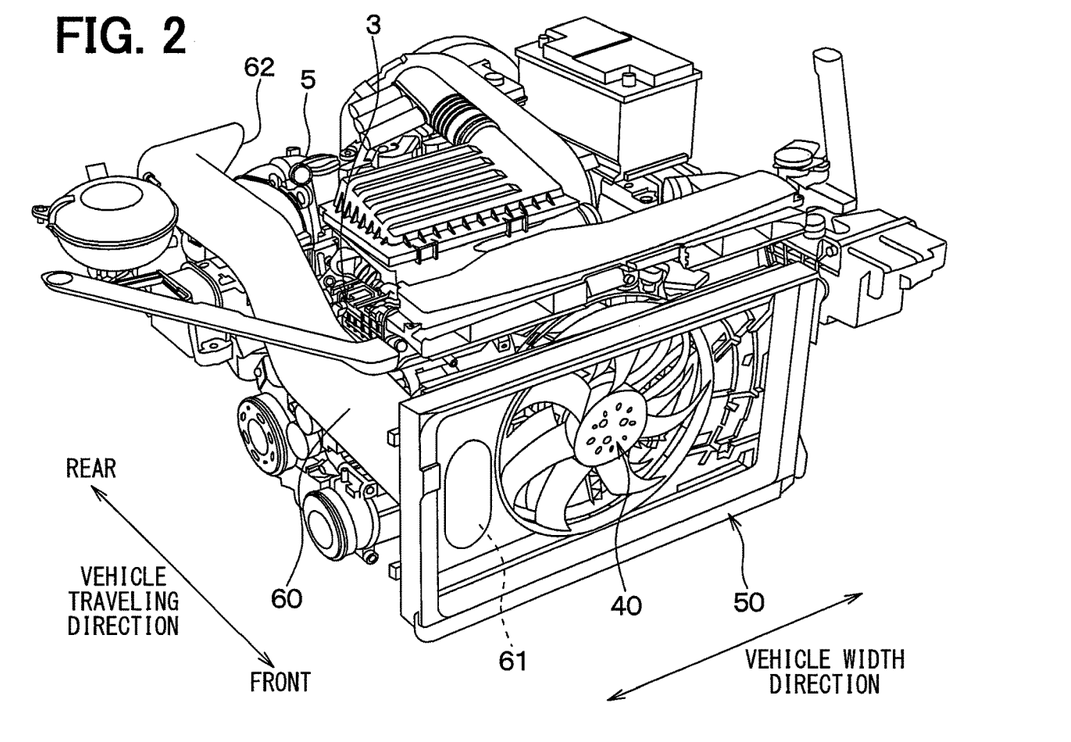
FIG. 2 is a perspective view showing a duct, an electric fan, and a driving engine of FIG. 1.

The duct 60 forms an air flow passage 60a that generate an air flow between the front side opening portion 61 and the rear side opening portion 62. The duct 60 is disposed on the upper side in the circumferential direction with respect to the driving engine 3. As shown in FIGS. 1 and 2, the front side opening portion 61 opens toward the radiator 30 (that is, toward the front in the vehicle traveling direction) on the rear side in the vehicle traveling direction with respect to the radiator 30 of the shroud 50. The front side opening portion 61 corresponds to the first opening portion and the rear side opening portion 62 corresponds to the second opening portion.

That is, the front side opening portion 61 opens on the downstream side in the air flow direction in the introduction flow passage 50a with respect to the radiator 30 in the introduction flow passage 50a. The front side opening portion 61 is disposed on one side in the vehicle width direction with respect to the electric fan 40. The rear side opening portion 62 opens to the exhaust manifold 5 side of the front engine compartment 1. In other words, the rear side opening portion 62 opens toward the exhaust manifold 5 in the front engine compartment 1.

The exhaust manifold 5 is a manifold which collects a plurality of exhaust flow passages connected to the driving engine 3 in one in an exhaust pipe for exhausting exhaust gas from the driving engine 3. The exhaust manifold 5 is disposed on the rear side in the vehicle traveling direction with respect to the driving engine 3 in the front engine compartment 1.

A turbine for a turbocharger and a catalytic device 5a (see FIG. 6) are disposed, in addition to the exhaust manifold 5, on the rear side in the vehicle traveling direction with respect to the driving engine 3 in the front engine compartment 1 of the present embodiment. The catalytic device 5a is a device for purifying harmful components in the exhaust gas blown out from the driving engine 3 by reduction and oxidation. The turbocharger takes out the rotational energy from the internal energy of the exhaust gas blown out from the driving engine 3 by the turbine and operates the compressor with the rotational energy to generate compressed air and supplies it to the intake port of the driving engine 3. The turbine for the turbocharger is a device for taking out rotational energy from internal energy of exhaust gas.

The valve 70 is disposed between the front side opening portion 61 and the rear side opening portion 62 of the duct 60 and is supported so that the air flow passage 60a can be opened and closed freely. The valve 70 is driven by the electric motor 80 (see FIG. 3) as described later.

Figure 3:
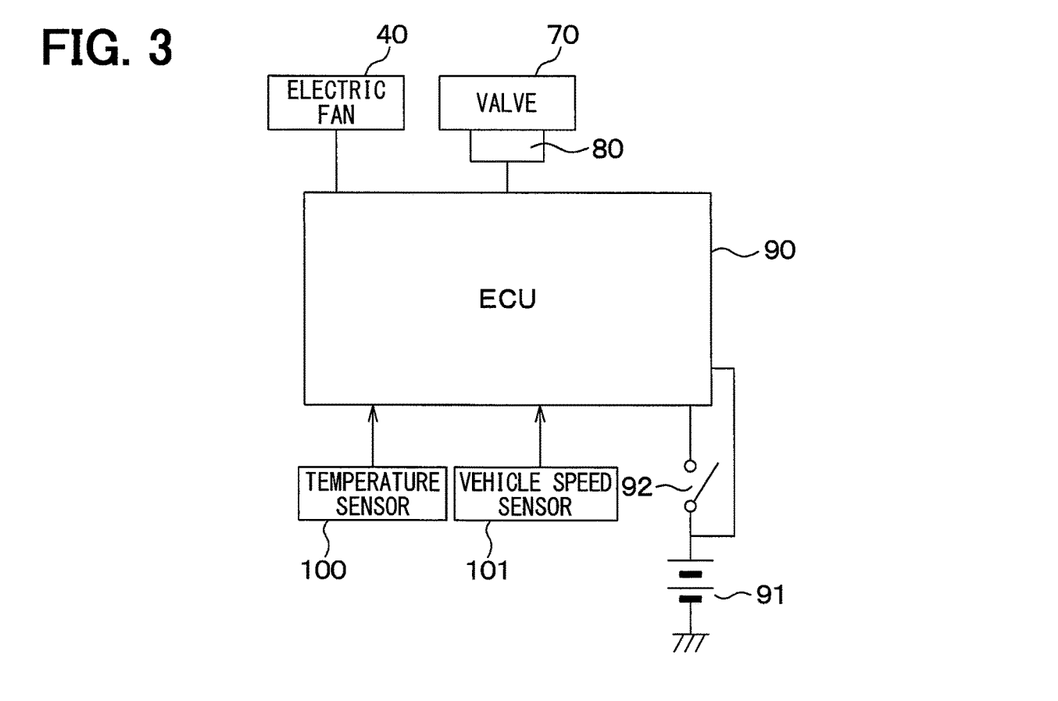
FIG. 3 is a diagram showing an electrical configuration of the cooling module of FIG. 1.

Next, an electrical configuration of the cooling module 10 of the present embodiment will be described with reference to FIG. 3.

The cooling module 10 includes an electronic control unit 90. The electronic control unit 90 is composed of a microcomputer, a memory, and the like. The electronic control unit 90 is a well-known electronic control device operated by being supplied with electric power from the in-vehicle battery 91. The memory is a non-transitional physical storage medium.

The electronic control unit 90 executes valve control process and fan control process according to a computer program stored in the memory.

When executing the valve control process, the electronic control unit 90 controls the valve 70 via the electric motor 80 based on a switch signal of an ignition switch 92, a detected value of a temperature sensor 100, and a detected value of a vehicle speed sensor 101. When executing the fan control process, the electronic control unit 90 controls the electric fan 40 based on the switch signal of the ignition switch 92 and the detected value of the temperature sensor 100.

The temperature sensor 100 is, for example, a temperature detection unit that detects the surface temperature of the exhaust manifold 5 as the temperature of the exhaust manifold 5. The vehicle speed sensor 101 detects the speed of the vehicle as the rotational speed of the driving wheel of the vehicle.

The ignition switch 92 is a power switch for turning on/off (that is, operating/stopping) the driving engine 3. The electric fan 40 is composed of, for example, an axial flow fan, an electric motor for driving the axial flow fan, and the shroud 50.

Next, a control process of the electronic control unit 90 will be described with reference to FIGS. 4 and 5.

Figure 4:
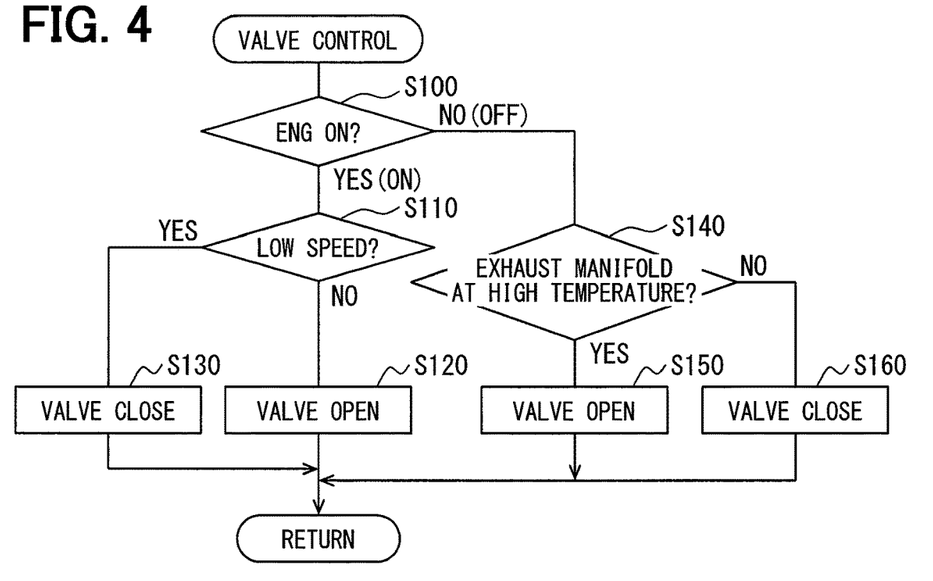
FIG. 4 is a flowchart showing a valve control process by an electronic control device of FIG. 3.

FIG. 4 is a flowchart showing valve control process. FIG. 5 is a flowchart showing the fan control process. The electronic control unit 90 executes the valve control process and the fan control process in parallel. Hereinafter, the valve control process will be described prior to the fan control process.

(Valve Control Process)

The electronic control unit 90 executes a computer program according to the flowchart of FIG. 4.

First, in step S100, it is determined whether or not the driving engine 3 is operating based on the output signal of the ignition switch 92. The driving engine 3 is marked as ENG in FIG. 4. Specifically, it is determined whether or not the ignition switch 92 is on. At this time, when the ignition switch 92 is turned on, it is determined that the driving engine 3 is in operation (that is, ON), and a determination of YES is made in step S100.

In the next step S110, it is determined whether or not the speed of the vehicle is less than the predetermined speed based on the detected value of the vehicle speed sensor 101. At this time, if the speed of the vehicle is equal to or higher than the predetermined speed, it is determined that the speed of the vehicle is high and a determination of NO is made in step S110.

In the present embodiment, for example, 40 km/h is used as the predetermined speed. Therefore, when the speed of the vehicle is 40 km/h or more, a determination of YES is made in step S110. In this case, in step S120, the electric motor 80 is controlled to open the valve 70. Therefore, the valve 70 is driven by the electric motor 80 to open the air flow passage 60a. Thereafter, the process returns to step S100.

On the other hand, when the speed of the vehicle is 0 km/h or more and less than 40 km/h, it is determined that the speed of the vehicle is lower than the predetermined speed (that is, low speed) based on the detected value of the vehicle speed sensor 101, and a determination of YES is made in step S110.

In this case, in step S130, the electric motor 80 is controlled to close the valve 70. Therefore, the valve 70 is driven by the electric motor 80 to close the air flow passage 60a. Thereafter, the process returns to step S100. By executing step S130, the valve control unit is realized.

Furthermore, when the ignition switch 92 is turned off in the above step S100, it is determined that the driving engine 3 is stopped (that is, OFF), and the determination of NO is made. At this time, in step S140, it is determined whether or not the temperature of the exhaust manifold 5 is equal to or higher than the threshold P1 according to the detected value of the temperature sensor 100. By executing step S140, the temperature determination unit realizes.

At this time, when the temperature of the exhaust manifold 5 is equal to or higher than the threshold value P1, it is determined that the exhaust manifold 5 is at a high temperature, and the determination of YES is made in step S140. Following this determination, in step S150, the electric motor 80 is controlled to open the valve 70. The valve 70 is driven by the electric motor 80 to open the air flow passage 60a. Thereafter, the process returns to step S100.

On the other hand, if the temperature of the exhaust manifold 5 is lower than the threshold P1 according to the detected value of the temperature sensor 100 in the above step S140, the determination of NO is made in step S140. That is, when the temperature of the exhaust manifold 5 is low, the determination of NO is made in step S140. Following this determination, in step S160, the electric motor 80 is controlled to close the valve 70. Therefore, the valve 70 is driven by the electric motor 80 to close the air flow passage 60a. Thereafter, the process returns to step S100.

Such processes of steps S100 to S160 are repeated to open and close the valve 70.

(Fan Control Process)

Figure 5:
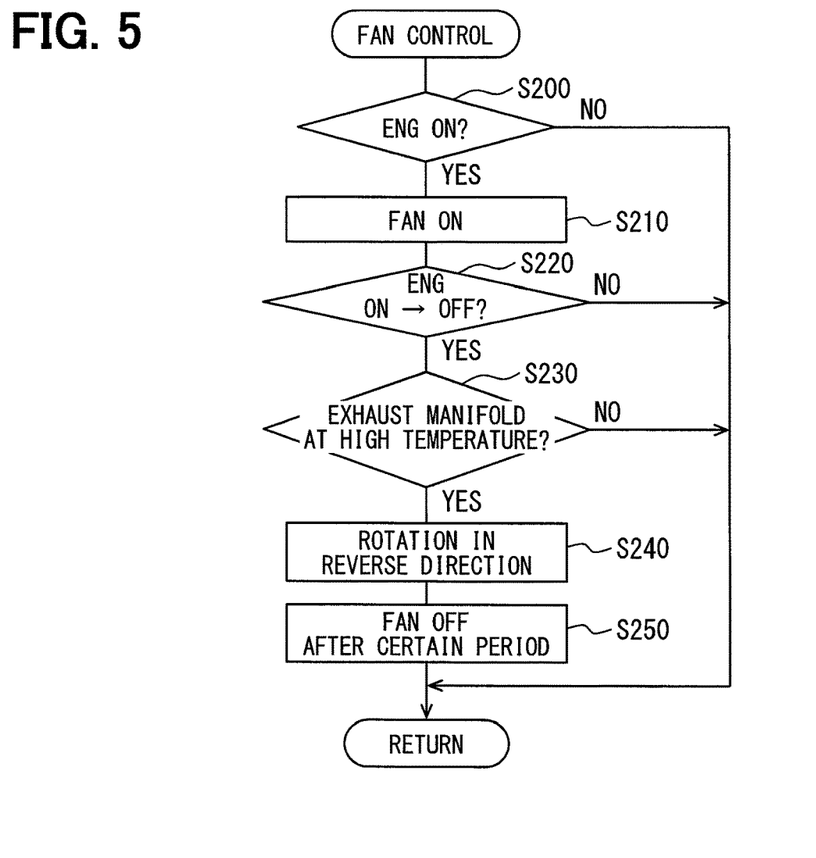
FIG. 5 is a flowchart showing a fan control process by the electronic control device of FIG. 3.

The electronic control unit 90 executes a computer program according to the flowchart of FIG. 5.

First, in step S200, it is determined whether or not the driving engine 3 is operating based on the output signal of the ignition switch 92. The driving engine 3 is marked as ENG in FIG. 5. When the ignition switch 92 is turned on, it is determined that the driving engine 3 is in operation (that is, ON), and a determination of YES is made in step S200. The step S200 is executed to realize the operation determination unit.

Following this determination, in step S210, the electric motor 42 of the electric fan 40 is controlled to rotate the fan 41 in a forward direction. Therefore, the fan 41 of the electric fan 40 sucks the air flow introduced through the front grille opening portion 2, the condenser 20, and the radiator 30 from the front side in the vehicle traveling direction of the vehicle and blows it toward the driving engine 3. The second control unit is realized by executing step S210.

As a result, the air flow introduced from the front side of the vehicle in the vehicle traveling direction of the vehicle through the front grille opening portion 2 is guided by the shroud 50 and passes through the condenser 20, the radiator 30, and the electric fan 40. Therefore, the driving engine 3 is cooled by the air flow flowing from the introduction flow passage 50a through the electric fan 40 to the driving engine 3 side.

Next, in step S220, based on the output signal of the ignition switch 92, it is judged whether or not a state of the driving engine 3 has changed from a state in which the driving engine 3 is operated (hereinafter referred to as "operating state") to a state in which the driving engine 3 is stopped (hereinafter referred to as "stopped state"). Specifically, it is determined whether or not the ignition switch 92 has changed from the ON state to the OFF state. The step S220 is executed to realize the operation determination unit.

Here, when the ignition switch 92 is changed from the ON state to the OFF state, it is determined that the driving engine 3 has shifted from the driving state to the stopped state, and the determination of YES is made in step S220.

Next, in step S230, it is determined whether or not the temperature of the exhaust manifold 5 is equal to or higher than the threshold P1 according to the detected value of the temperature sensor 100.

At this time, when the temperature of the exhaust manifold 5 is equal to or higher than the threshold value P1, it is determined that the exhaust manifold 5 is at a high temperature, and the determination of YES is made in step S230.

At this time, in step S240, the electric motor 42 of the electric fan 40 is controlled to rotate the fan 41 in the reverse direction. Therefore, the fan 41 of the electric fan 40 sucks the air flow from the driving engine 3 side, and blows out the sucked air to the front side in the vehicle traveling direction of the vehicle. By executing step S240, the first control section is realized.

Thereafter, in step S250, the electric fan 40 is stopped after a certain period. That is, when the driving engine 3 stops, the electric fan 40 performs the reverse rotation operation for a certain period thereafter, and then the electric fan 40 is stopped. Thereafter, the process returns to step S200.

When the ignition switch 92 is turned off in the above step S200, it is determined that the driving engine 3 is stopped and the determination of NO is made. Thereafter, the process returns to step S200.

Furthermore, in step S220, if the ignition switch 92 is maintained in the ON state and the driving engine 3 is continuously operating, the determination of NO is made. In this case, the forward rotation of the electric fan 40 is continued, and the process returns to step S200.

When, in step S230, the temperature of the exhaust manifold 5 is lower than the threshold P1, it is determined that the exhaust manifold 5 is at a low temperature, and the determination of NO is made in step S230. In this case, the forward rotation of the electric fan 40 is stopped, and the process returns to step S200.

By repeating the processes of steps S200 to S250, the electric fan 40 is operated based on a combination of the operating condition of the driving engine 3 and other conditions.

That is, when the driving engine 3 stops, the electric fan 40 performs the reverse rotation operation for a certain period thereafter, and then the electric fan 40 is stopped.

Next, the specific operation of the cooling module 10 of the present embodiment will be described.

First, in step S110, when it is determined that the vehicle speed is low and the determination of YES is made, in steps S210 and S130, the valve 70 is closed while the electric motor 80 is rotated in the forward direction.

Here, when the valve 70 opens the air flow passage 60a while the speed of the vehicle is low, the air flow flowing from the exhaust manifold 5 side through the duct 60 to the electric fan 40 side is generated by rotating the electric fan 40 in the forward direction. Therefore, the flowing amount of the air flow flowing from the front grille opening portion 2 to the electric fan 40 side through the condenser 20 and the radiator 30 decreases.

On the other hand, in step S130 of the present embodiment, when the speed of the vehicle is low, the electric motor 80 is controlled to close the valve 70. Therefore, the valve 70 is driven by the electric motor 80 to close the air flow passage 60a.

Therefore, even if the electric fan 40 rotates in the forward direction, the air flow flowing from the exhaust manifold 5 side through the duct 60 to the electric fan 40 side is not generated. Therefore, it is possible to ensure the flowing amount of the air flow passing through the condenser 20, the radiator 30, and the electric fan 40 from the front grille opening portion 2. Therefore, the condenser 20, the radiator 30, and the driving engine 3 are efficiently cooled by the air flow.

When it is determined that the vehicle speed is high, in step S110, the electric motor 80 is controlled to open the valve 70 in step S120.

Here, when the vehicle is traveling, the electric motor 42 of the electric fan 40 is controlled to rotate the fan 41 in the forward direction in step S210. Therefore, the electric fan 40 sucks air from the front side in the vehicle traveling direction of the vehicle and blows it out to the driving engine 3. In addition to this configuration, when the vehicle travels, an air flow is generated as a vehicle traveling wind passing through the front grille opening portion 2, the condenser 20, the radiator 30, and the electric fan 40 from the front side in the vehicle traveling direction of the vehicle.

Figure 6:
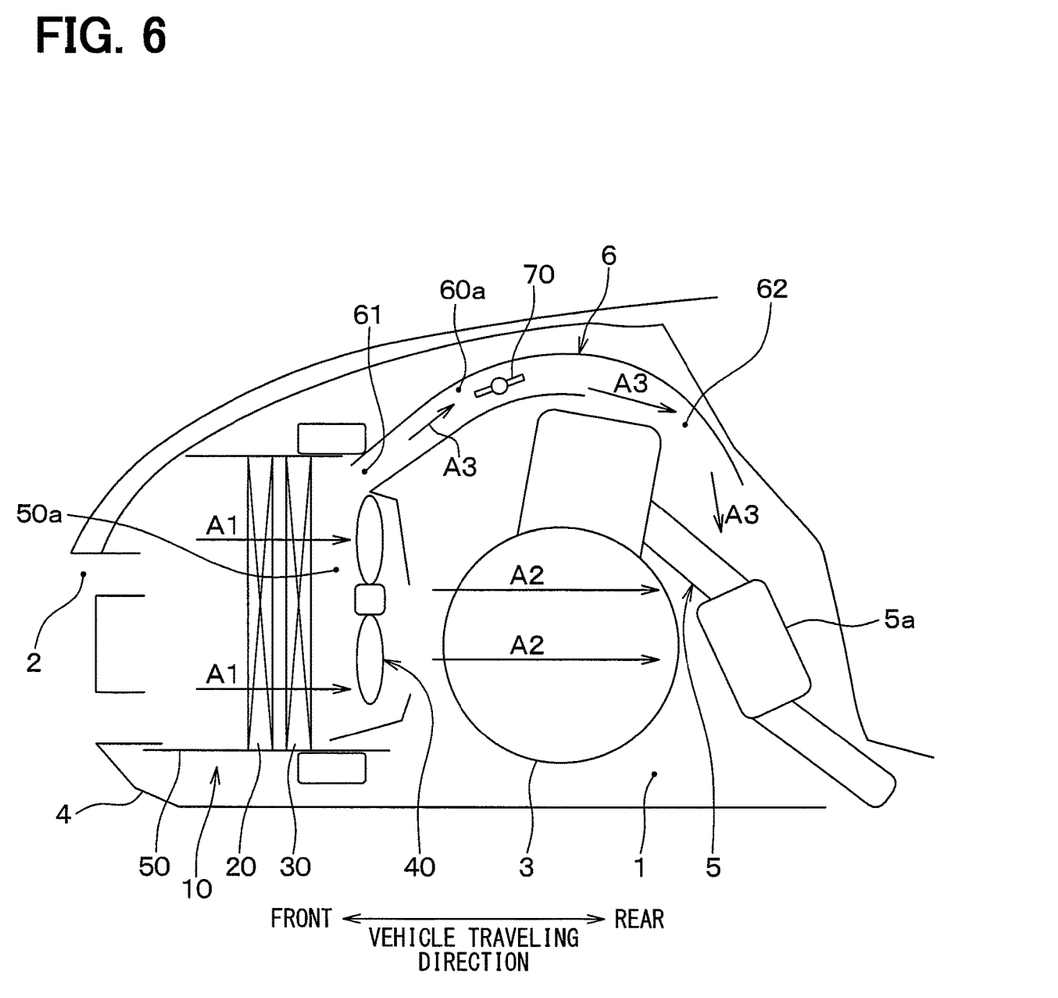
FIG. 6 is a side view showing the duct, the electric fan, and the exhaust manifold of FIG. 1, and showing the air flow flowing from the exhaust manifold side to the electric fan through the duct while the vehicle is traveling.

As described above, when the vehicle is traveling at a high speed, the air flow passing through the front grille opening portion 2, the condenser 20, the radiator 30, and the electric fan 40 from the front side in the vehicle traveling direction is generated, as indicated by arrows A1 and A2 in FIG. 6A.

Therefore, a part of the air flow that has passed through the front grille opening portion 2, the condenser 20, and the radiator 30 from the front side in the vehicle traveling direction of the vehicle is introduced into the duct 60 through the front side opening portion 61 and is blown out from the rear side opening portion 62 to the exhaust manifold 5 side, as shown by the arrow A3. Therefore, the air flow blown out from the rear side opening portion 62 of the duct 60 is directly blown to the object to be cooled such as the exhaust manifold 5, the catalytic device 5a, and the turbocharger turbine. Therefore, the object to be cooled is cooled by the air flow blown from the duct 60.

The air flow which cooled the object to be cooled flows to the floor side of the exhaust manifold 5. As a result, the air flow flowing through the front grille opening portion 2, the condenser 20, the radiator 30, the duct 60, and the periphery of the exhaust manifold 5 and flowing to the floor side of the vehicle is generated.

Among the air flow introduced into the introduction flow passage 50a through the front grille opening portion 2 from the front side in the vehicle traveling direction of the vehicle, the remaining air flow other than the air flow flowing into the duct 60 is sucked into the electric fan 40. The remaining air sucked by the electric fan 40 passes around the driving engine 3 and flows to the floor side. Therefore, the driving engine 3 is cooled by the air flow flowing from the introduction flow passage 50a through the electric fan 40 to the driving engine 3 side.

Thereafter, in steps S140 and S230, the electronic control unit 90 determines that the driving engine 3 is shifted from the operating state to the stopped state and the exhaust manifold 5 is at a high temperature, and therefore the determination of YES is made. Then, in step S150, the electric motor 80 is controlled to open the valve 70, and in step S240 the electric motor 42 is controlled so as to rotate the fan 41 of the electric fan 40 in the reverse direction.

Figure 7:
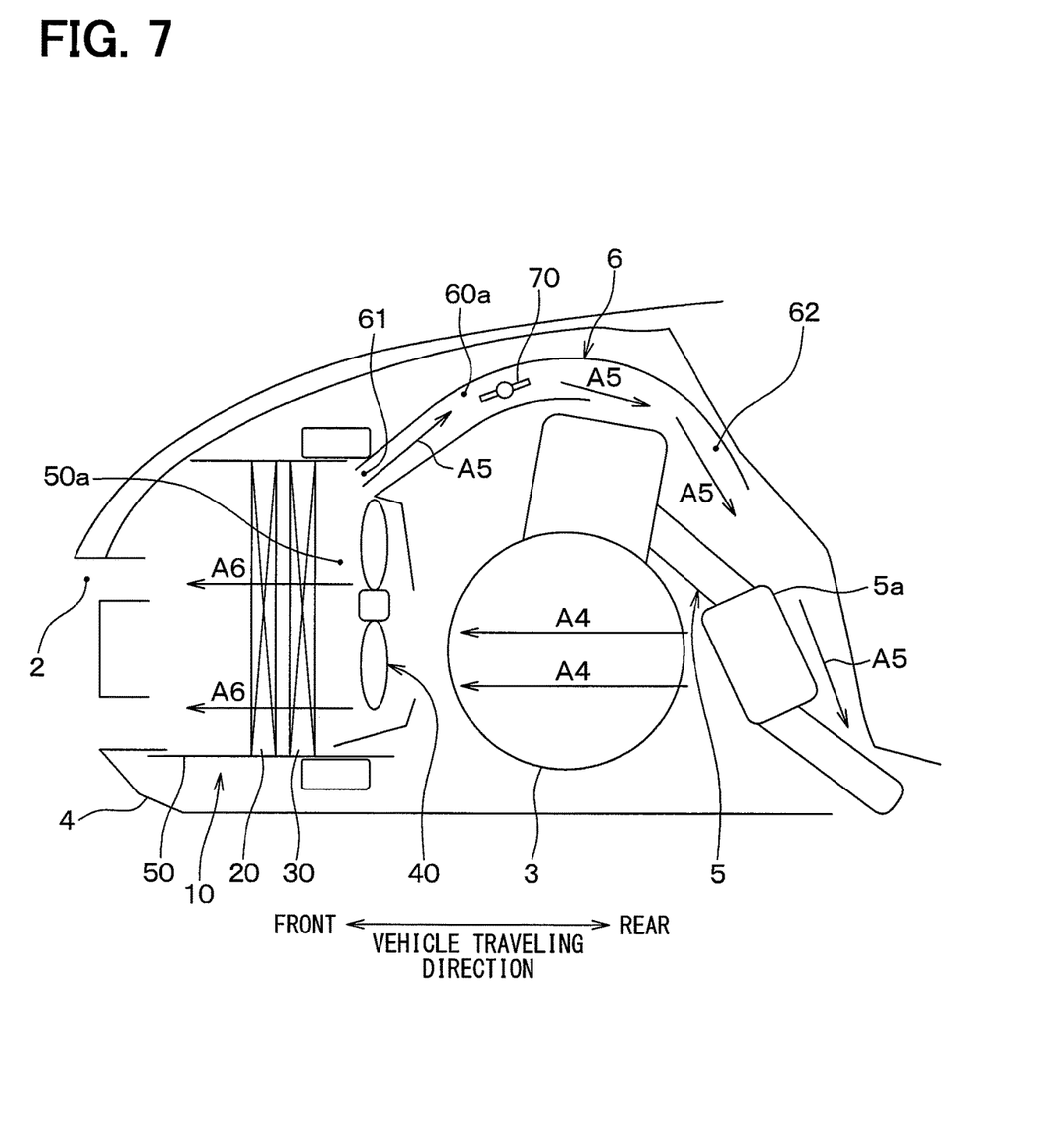
FIG. 7 is a side view showing the duct, the electric fan, and the exhaust manifold of FIG. 1, and showing the air flow flowing from the electric fan to the exhaust manifold through the duct, in a case where the driving engine is stopped and the electric fan is operated in a reverse direction.

Therefore, the fan 41 of the electric fan 40 sucks the air flow from the driving engine 3 side and blows it into the introduction flow passage 50a, as indicated by the arrow A4 in FIG. 7.

As indicated by arrow A5, a part of the air flow blown out from the electric fan 40 is introduced into the air flow passage 60a of the duct 60 from the front side opening portion 61 and is blown out the introduced air flow to the exhaust manifold 5 side from the rear side opening portion 62. Therefore, the air flow blown out from the rear side opening portion 62 of the duct 60 is directly blown to the object to be cooled such as the exhaust manifold 5, the catalytic device 5a, and the turbocharger turbine. Therefore, the object to be cooled is cooled by the air flow blown from the duct 60.

On the other hand, among the air flow blown out from the electric fan 40, the air flow other than the air flow flowing into the duct 6 flows through the radiator 30, the condenser 20, and the front grille opening portion 2 to the front side in the vehicle traveling direction of the vehicle, as indicated by the arrow A6.

When the driving engine 3 is stopped, it is determined that the exhaust manifold 5 is at a low temperature, and the determination of NO is made in step S150. In this case, the electric fan 40 is stopped.

According to the present embodiment described above, the exhaust manifold 5 is disposed at the rear in the vehicle traveling direction with respect to the driving engine 3 in the front engine compartment 1 of the vehicle. The duct 60 has the front side opening portion 61 that opens toward the front in the vehicle traveling direction with respect to the driving engine 3 and the rear side opening portion 62 that opens toward the exhaust manifold 5 with respect to the driving engine 3, and the duct 60 flows the air flow in the air flow passage 60a. The valve 70 opens and closes the air flow passage 60a of the duct 60. The electronic control unit 90 controls the electric motor 42 so as to rotate the fan 41 of the electric fan 40 in the reverse direction when it is determined that the driving engine 3 is shifted from the operating state to the stopped state and the exhaust manifold 5 is at a high temperature.

Therefore, the fan 41 rotates in one rotation direction, so that the air flow is sucked from the driving engine 3 side and is blown into the introduction flow passage 50a. A part of the air flow blown out from the electric fan 40 is blown out to the exhaust manifold 5 side through the duct 6. Thus, since the air flow can be directly blown to the object to be cooled such as the exhaust manifold 5, the catalytic device 5a, and the turbine for the turbocharger, the object to be cooled can be efficiently cooled by the air flow.

In the present embodiment, when determining that the driving engine 3 is in the operating state, the electronic control unit 90 controls the electric motor 42 so as to rotate the fan 41 of the electric fan 40 in the forward direction. Therefore, the fan 41 rotates in other rotation direction, and sucks the air flow introduced from the front side of the vehicle in the vehicle traveling direction through the front grille opening portion 2, the condenser 20, and the radiator 30 and blows it out to the driving engine 3.

Here, one rotation direction indicates the direction in which the fan 41 rotates when the fan 41 rotates in the reverse direction. The other rotational direction indicates the direction in which the fan 41 rotates when the fan 41 rotates in the forward direction. That is, one rotation direction and the other rotation direction indicate directions opposite to each other in the rotation direction of the fan 41.

As described above, the object to be cooled such as the condenser 20, the radiator 30, and the driving engine 3 can be cooled by the air flow.

As described above, in the present embodiment, the electronic control unit 90 can efficiently cool the object to be cooled by switching the rotational direction of the fan 41 of the electric fan 40 according to the operating state of the driving engine 3.

Second Embodiment

In the second embodiment, as compared with the first embodiment, an embodiment in which a shutter 94 for opening and closing the introduction flow passage 50a is additionally provided will be described with reference to FIG. 8.

Figure 8:
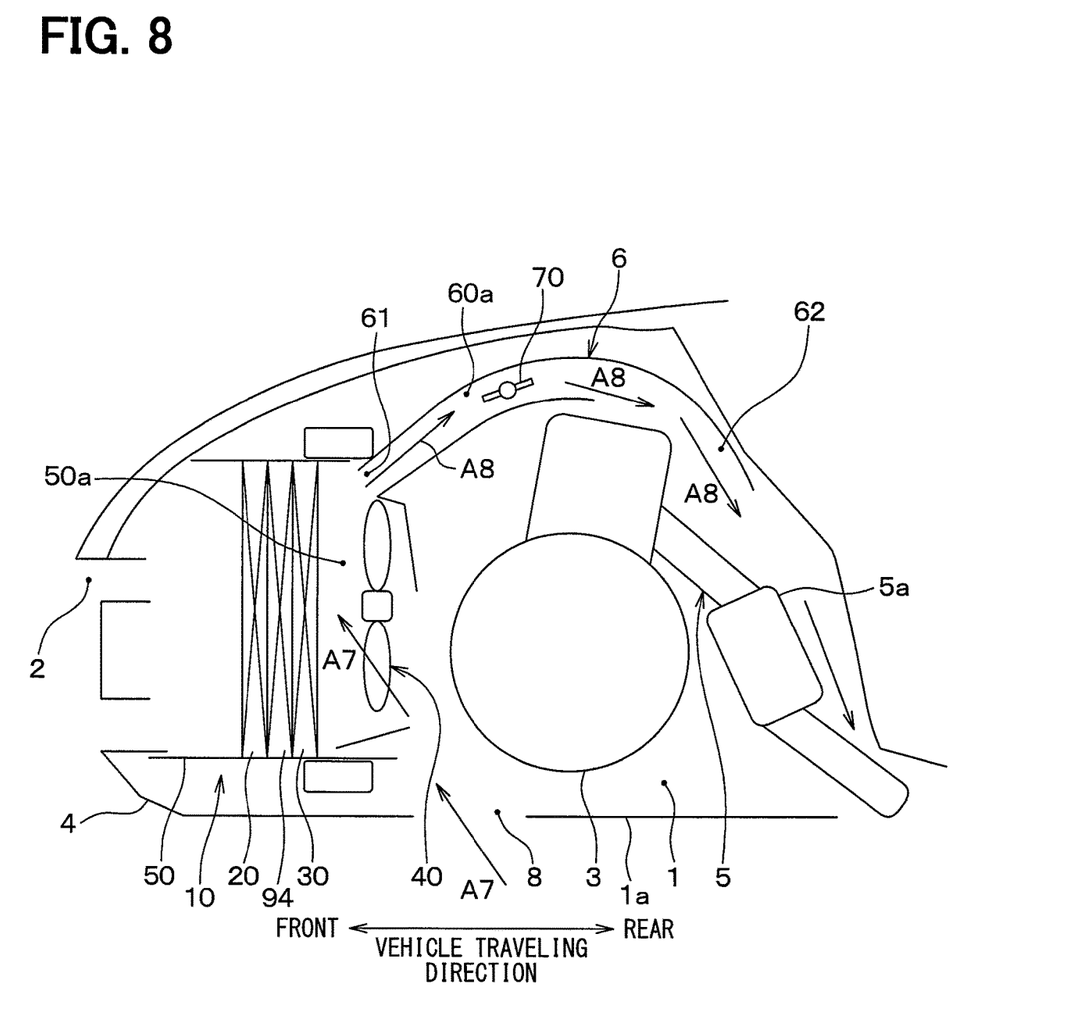
FIG. 8 is a side view showing a duct, an electric fan, and an exhaust manifold in the cooling module according to a second embodiment, and showing the air flow flowing from a floor opening portion to the exhaust manifold side through the electric fan and the duct, in a case where the driving engine is stopped and the electric fan is operated in a reverse direction.

FIG. 8 shows the configuration of the cooling module 10 of the present embodiment. The shutter 94 is composed of a valve body that opens and closes the introduction flow passage 50a and an electric actuator that drives the valve body.

As the electric actuator of the present embodiment, an electric motor, an electromagnetic solenoid or the like are used. The electric actuator is controlled by the electronic control unit 90.

The shutter 94 is an opening/closing portion arranged between the radiator 30 and the condenser 20. Therefore, the front side opening portion 61 of the duct 60 is opened to the electric fan 40 side with respect to the shutter 94 in the introduction flow passage 50a.

In the present embodiment, the floor opening portion 8 is formed in the under cover 1a constituting the floor of the front engine compartment 1 in the vehicle. The floor opening portion 8 communicates between the front engine compartment 1 and the floor, and functions as an outside air suction port for taking the outside air of the vehicle into the front engine compartment 1 from the floor. The floor opening portion 8 is opened to the floor (that is, the outside of the vehicle) from the inside of the front engine compartment 1 between the driving engine 3 and the electric fan 40.

In the cooling module 10 of the present embodiment, the configurations other than the shutter 94 and the floor opening portion 8 are the same as those of the cooling module 10 of the first embodiment, and the description thereof will be omitted.

Next, the operation of the cooling module 10 of the present embodiment will be described.

First, when the ignition switch 92 is turned on and it is determined that the driving engine 3 is running, the electronic control unit 90 controls the shutter 94 to open the introduction flow passage 50a. Therefore, along with the forward rotation of the electric fan 40, an air flow that flows from the front grille opening portion 2 through the condenser 20, the radiator 30, and the electric fan 40 is generated.

When the driving engine 3 transitions from the operating state to the stopped state and it is determined that the exhaust manifold 5 is at a high temperature, the determination of YES is made in steps S140 and S230. Thereafter, the electronic control unit 90 controls the shutter 94 to close the introduction flow passage 50a.

In this case, the electronic control unit 90 controls the electric motor 80 to open the valve 70 in step S150, and also controls the electric motor 42 to rotate the fan 41 of the electric fan 40 in the reverse direction in step S240.

Along with this configuration, the electric fan 40 sucks the air flow from the floor of the vehicle through the floor opening portion 8 as shown by the arrow A7, and the air flow blows out to the radiator 30 side (that is, the front side in the vehicle traveling direction). However, the air flow which flows to the front grille opening portion 2 side is blocked by the shutter 94. Therefore, as the electric fan 40 rotates in the reverse direction, the air flow that has passed through the floor opening portion 8 and the electric fan 40 from the floor side is pushed into the front side opening portion 61 of the duct 6 as indicated by the arrow A8. The pushed air flow is blown out to the exhaust manifold 5 side after passing through the air flow passage 60a and the rear side opening portion 62.

According to the present embodiment described above, when the driving engine 3 transitions from the operating state to the stopped state and it is determined that the exhaust manifold 5 is at a high temperature, the determination of YES is made in steps S140 and S230. Thereafter, the electronic control unit 90 controls the shutter 94 to close the introduction flow passage 50a. As a result, the shutter 94 prevents the air flow blown out from the electric fan 40 to flow toward the front grille opening portion 2 side.

Along with this configuration, with the reverse rotation of the electric fan 40, the air flow that has passed through the electric fan 40 from the driving engine 3 side is blown out to the exhaust manifold 5 side through the duct 6.

As a result, the amount of air flow blown directly from the duct 6 to the object to be cooled such as the exhaust manifold 5, the catalytic device 5a, and the turbocharger turbine can be increased compared with the embodiment where the shutter 94 is not provided, it can be efficiently cooled by the air flow.

In the present embodiment, the electric fan 40 can blow air in floor of the vehicle (that is, the outside of the vehicle) to the object to be cooled through the duct 6. Therefore, since a low-temperature air flow can be blown to the object to be cooled, the object to be cooled can be efficiently cooled by the air flow.

Third Embodiment

In the second embodiment, the example in which the air outside the vehicle is guided to the duct 6 through the floor opening portion 8 has been described. Instead of this configuration, by using the front opening portion 95 instead of the floor opening portion 8, the third embodiment in which the air outside the vehicle is guided to the duct 6 will be described with reference to FIG. 9.

Figure 9:
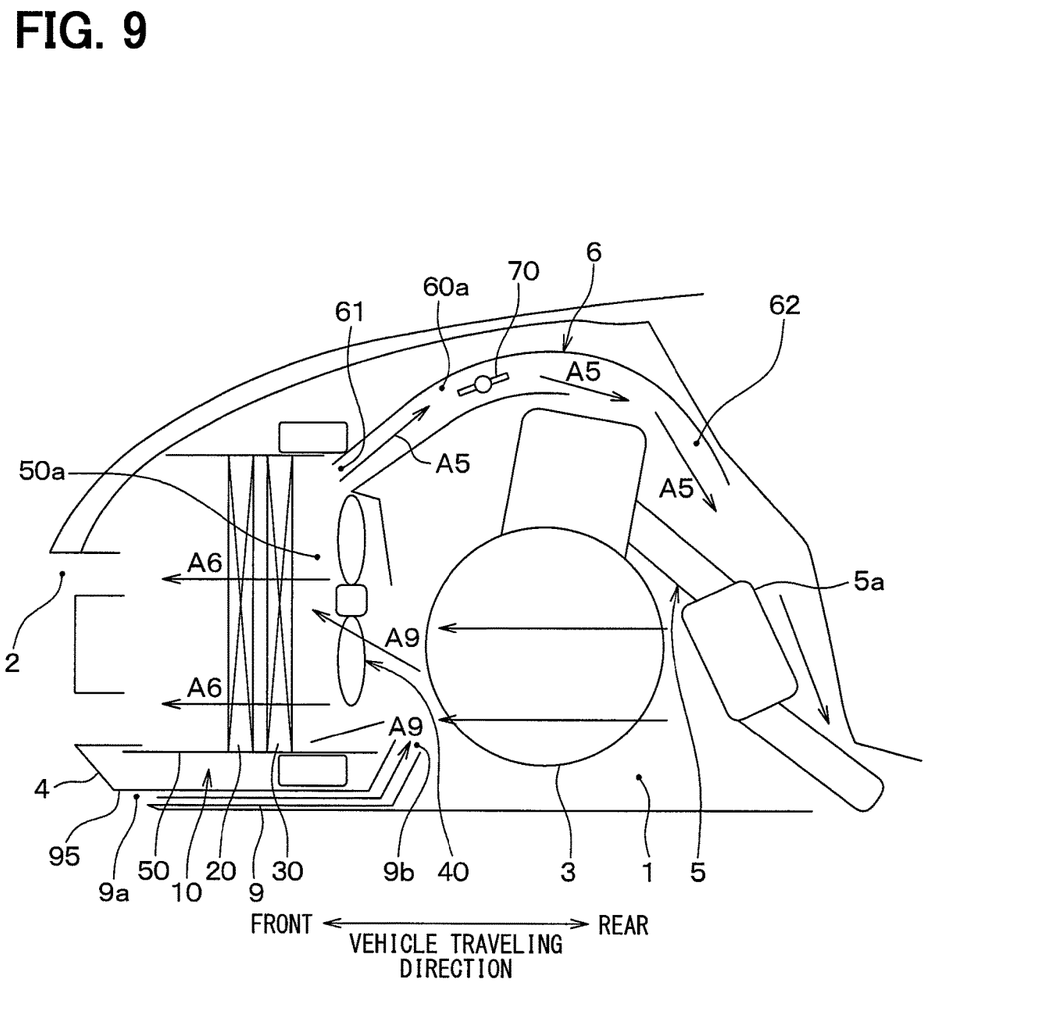
FIG. 9 is a side view showing a duct, an electric fan, and an exhaust manifold in the cooling module according to a third embodiment, and showing the air flow flowing to the exhaust manifold side through the front opening portion, the duct, the electric fan and the duct, in a case where the driving engine is stopped and the electric fan is operated in a reverse direction.

In the present embodiment, a front opening portion 95 which replaces the floor opening portion 8 is opened from the front engine compartment 1 to the front side in the vehicle traveling direction in the front grille 4. The front opening portion 95 is disposed on the lower side in the circumferential direction with respect to the front grille opening portion 2.

The front opening portion 9a of the duct 9 is connected to the front opening portion 95. The duct 9 is provided with a rear opening portion 9b opened between the electric fan 40 and the driving engine 3.

In the cooling module 10 of the present embodiment, the shutter 94 is eliminated. In the cooling module 10 of the present embodiment, the configuration other than the front opening portion 95 is the same as that of the cooling module 10 of the second embodiment, so its description will be omitted.

Next, the operation of the cooling module 10 of the present embodiment will be described.

First, when the electronic control unit 90 judges that the driving engine 3 is shifted from the running state to the stopped state and that the exhaust manifold 5 is at a high temperature, the determination of YES is made in the steps S140 and S230. Then, in steps S150 and S240, the electric motor 80 is controlled to open the valve 70 and to control the electric motor 42 so as to rotate the fan 41 of the electric fan 40 in the reverse direction.

In this case, as indicated by the arrow A9, the electric fan 40 sucks the air flow from the front side in the vehicle traveling direction (that is, the outside of the vehicle) through the front opening portion 95 and the duct 9, and the sucked air flow is blown to the introduction flow passage 50a.

A part of the air flow blown out from the electric fan 40 is introduced into the air flow passage 60a from the front side opening portion 61 and the introduced air flow is blown out from the rear side opening portion 62 to the exhaust manifold 5 side. As a result, the exhaust manifold 5, the catalytic device 5a, and the turbocharger turbine can be cooled by the air flow.

On the other hand, the remaining air flow other than the air flow flowing in the duct 6 among the air flow blown out from the electric fan 40 flows to the front side in the vehicle traveling direction through the radiator 30, the condenser 20, and the front grille opening portion 2, as indicated by arrow A6.

According to the present embodiment described above, when the driving engine 3 transitions from the operating state to the stopped state and it is determined that the exhaust manifold 5 is at a high temperature, the electric fan 40 sucks the air flow from the front side in the vehicle traveling direction to the front opening portion 95 through the duct 9 and the front opening portion 95, and the sucked air flow is blown into the introduction flow passage 50a. A part of this blown air flow can directly blow the air flow to the object to be cooled through the duct 6, so that the object to be cooled can be more efficiently cooled by the air flow.

OTHER EMBODIMENTS (1) In the second embodiment, the example in which the shutter 94 is disposed between the radiator 30 and the condenser 20 is described, but instead of this configuration, it may be as shown in the followings (a) and (b). (a) The shutter 94 is disposed between the radiator 30 and the electric fan 40. (b) The shutter 94 is disposed between the condenser 20 and the front grille opening portion 2.

(2) In the first to third embodiments, the example in which the duct 60 is disposed on the upper side in the circumferential direction of the driving engine 3 is described, but instead of this configuration, the duct 60 is arranged in the vehicle width direction of the driving engine 3.

(3) In the first to third embodiments, the example in which the valve 70 is disposed between the front side opening portion 61 and the rear side opening portion 62 of the duct 60 is described. However, the present invention is not limited to this example, and a valve 70 for opening and closing the air flow passage 60a by opening and closing the front side opening portion 61 of the duct 60 may be provided. Alternatively, a valve 70 for opening and closing the air flow passage 60a by opening and closing the rear side opening portion 62 of the duct 60 may be provided.

(4) In the second embodiment, the shutter 94 including the valve body that opens and closes the introduction flow passage 50a and the electric actuator that drives the valve body is used. However, instead of this configuration, the shutter 94 for opening and closing the introduction flow passage 50a by manual.

(5) In the third embodiment, an example in which the duct 9 is used to guide the air flow from the front opening portion 95 of the front grille 4 to the electric fan 40 is described, but instead of this configuration, the duct 9 for guiding the air flow from the front opening portion 95 of the front grille 4 to the electric fan 40 may be used while adopting the shutter 94 of the second embodiment.

(6) In the first to third embodiments, the exhaust manifold 5, the catalyst device 5a, the turbocharger turbine, and the like on the rear side in the vehicle traveling direction with respect to the driving engine 3 in the front engine compartment 1 are the object to be cooled. However, the present invention is not limited to this example, the devices (for example, a battery or an electronic device) located in the vehicle width direction (that is, in the lateral direction of the vehicle) with respect to the driving engine 3 in the front engine compartment 1 may be the object to be cooled.

In this case, the rear side opening portion 62 of the duct 60 opens in the vehicle width direction with respect to the driving engine 3 in the front engine compartment 1.

(7) In the first to third embodiments, the example in which the valve 70 for opening and closing the front side opening portion 61 of the duct 60 is provided is described, but instead of this configuration, the valve 70 for opening and closing the front side opening portion 61 of the duct 60 may be abolished.

(8) In the first to third embodiments, the example in which the temperature of the exhaust manifold 5 used in the process of steps S140 and S230 (hereinafter referred to as "exhaust manifold temperature") is directly detected by the temperature sensor 100 is described, but in place of this configuration, the temperature of the exhaust gas or the temperature of the engine water may be detected by the temperature sensor 100 and the detected temperature is set to the exhaust temperature, so that the detected temperature may be used in the process of steps S140 and S230.

(9) The present disclosure is not limited to the embodiments described above but may be appropriately modified. The above embodiments are not necessarily unrelated to each other and can be combined in any appropriate combination unless such a combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Furthermore, a shape, positional relationship or the like of a structural element, which is referred to in the embodiments described above, is not limited to such a shape, positional relationship or the like, unless it is specifically described or obviously necessary to be limited in principle.

(Summary)

According to the first aspect described in the first to fourth embodiments and some or all of the other embodiments, the cooling module applied to a vehicle having a blower that is located on the front side in the vehicle traveling direction with respect to the driving engine in the front engine compartment includes the duct. The duct has a first opening portion opening to the front side in the vehicle traveling direction with respect to the driving engine in the front engine compartment and a second opening portion opening to the object to be cooled other than the driving engine in the front engine compartment, and an air flow is caused to flow between the first opening portion and the second opening portion. In the duct, the air flow blown from the blower is pushed into the first opening portion, and the pushed air flow is blown out from the second opening portion to the object to be cooled.

According to the second aspect, there is provided the transition determination unit that determines whether or not the driving engine has shifted from the operating state to the stopped state, the temperature determination unit that determines whether or not the temperature of the cooling object is higher than a threshold value based on the detected value of the temperature detection unit, and a control unit that controls the blower. When the transition determination unit determines that the driving engine has shifted from the operating state to the stopped state and the temperature determination unit determines that the temperature of the object to be cooled is higher than the threshold value, the control unit controls the blower so that the air flow pushed into the duct is blown out from the second opening portion to the object to be cooled.

Therefore, when the driving engine is stopped and the object to be cooled is at a high temperature, the object to be cooled can be efficiently cooled.

According to the third aspect, the blower includes the fan for generating the air flow by rotation and the drive unit for rotating the fan. The first control section of the control unit controls the drive unit so as to rotate the fan to one side in the rotation direction so that the air flow pushed into the duct from the first opening portion is directed blown from the second opening portion to the object to be cooled. The cooling module includes the operation determination unit that determines whether or not the driving engine is in an operating state, and the second control unit. When the operation determination unit determines that the driving engine is in an operating state, the second control section controls the drive unit so as to rotate the fan to the other side in the rotation direction, so that the air flow having passed through the fan from the front side in the vehicle traveling direction is blown to the driving engine.

Therefore, it is possible to efficiently cool the object to be cooled simply by switching the rotation direction of the fan.

That is, one rotation direction and the other rotation direction indicate directions opposite to each other in the rotation direction of the fan.

According to the fourth aspect, the cooling module is applied to a vehicle that forms the introduction flow passage that allows an air flow to flow between the front opening portion that opens the front engine compartment toward the front side in the vehicle traveling direction and the blower. This cooling module has a shutter that opens and closes the introduction flow passage, and the first opening of the duct is positioned on the side of the blower with respect to the shutter in the introduction flow passage. When the shutter closes the introduction flow passage, in the duct, the air flow blown out from the blower is pushed into the first opening portion, and the pushed air flow is blown out from the second opening portion to the object to be cooled.

Therefore, since the shutter suppresses the air flow through the introduction flow passage and the front opening portion flowing from the blower, the amount of air flowing from the blower to the object to be cooled through the duct can be increased.

According to the fifth aspect, the cooling module is applied to the vehicle that forms the outside air suction port opening from the front engine compartment to the outside of the vehicle. The blower sucks the air flow through the outside air suction port and blows out the sucked air flow. In the duct, the air flow blown out from the blower is pushed into the first opening portion, and the pushed air flow is blown from the second opening portion to the object to be cooled.

Therefore, since in the duct the air flow is sucked from the outside air suction port and blows out the sucked air flow to the object to be cooled, it is possible to blow out a low temperature air flow to the object to be cooled. Therefore, it is possible to efficiently cool the object to be cooled.

The invention claimed is:

1. A cooling module applied to a vehicle having a blower arranged on a front side in a vehicle traveling direction with respect to a driving engine in a front engine compartment, comprising:
    a duct having a first opening portion and a second opening portion so as to form an air flow between the first opening portion and the second opening portion, wherein the first opening portion opens to the front side in the vehicle traveling direction with respect to the driving engine in the front engine compartment and the second opening portion opens to an object to be cooled in the front engine compartment other than the driving engine,
    wherein in the duct the air flow blown out from the blower after being sucked into the blower from the driving engine side rather than the blower is pushed into the first opening portion and the pushed air flow is blown out from the second opening portion to the object to be cooled.

2. The cooling module according to claim 1, further comprising:
    a transition determination unit configured to determine whether or not the driving engine is shifted from an operating state to a stopped state;
    a temperature determination unit configured to determine whether or not the temperature of the object to be cooled is higher than a threshold value based on a detected value of a temperature detection unit that detects a temperature of the object to be cooled; and
    a control unit configured to control the blower so that the air flow pushed into the duct from the first opening portion is blown out to the object to be cooled from the second opening portion, when the transition determination unit determines that the driving engine is shifted from the operating state to the stopped state and the temperature determination unit determines that the temperature of the object to be cooled is higher than a threshold value.

3. The cooling module according to claim 2, wherein
    the blower has a fan configured to generate an air flow by rotation and a drive unit configured to rotate the fan, and
    the control unit includes a first control section that controls the drive unit so as to rotate the fan to one side in the rotation direction so that the air flow pushed into the duct from the first opening portion is blown out from the second opening portion to the object to be cooled, the cooling module, further comprising
an operation determination unit configured to determine whether the driving engine is in an operating state or not, and
a second control unit configured to blow out the air flow which passes through the fan from the front side in the vehicle traveling direction to the driving engine by controlling the drive unit so as to rotate the fan to the other side in the rotation direction, when the operation determination unit determines that the driving engine is in an operating state.

4. The cooling module according to claim 3, further comprising:
a valve configured to open and close a flow of the air flow between the first opening portion and the second opening portion of the duct, and
a valve control unit configured to close the valve when the driving engine is in an operating state and the speed of the vehicle is less than a predetermined speed, wherein
the valve control unit and the second control section are executed in parallel.

5. The cooling module according to claim 2, wherein
the blower has a fan configured to generate the air flow by rotation and a drive unit configured to rotate the fan,
the fan sucks an air flow from the front side in the vehicle traveling direction rather than the fan and blows out toward the driving engine side rather than the fan, when the fan rotates in a forward direction,
the fan sucks an airflow from the driving engine side rather than the fan and blows out the sucked air toward the front side in the vehicle traveling direction rather than the fan, when the fan rotates in a reverse direction, and
the control unit configured to control the blower controls the drive unit of the blower so as to continue the operation of the rotation in the reverse direction for a certain period.

6. The cooling module according to claim 1, wherein
the cooling module is applied to a vehicle having an introduction flow passage configured to allow an air flow to flow between a front opening portion that opens the front engine compartment in the front side in the vehicle traveling direction and the blower,
the cooling module, further comprising
a shutter configured to open and close the introduction flow passage,
wherein the first opening portion of the duct is positioned on the side of the blower with respect to the shutter in the introduction flow passage, and
in a state where the shutter closes the introduction flow passage, in the duct, the air flow blown out from the blower is pushed into the first opening portion, and the pushed air flow is blown out from the second opening portion to the object to be cooled.

7. The cooling module according to claim 1, wherein
the cooling module is applied to the vehicle having the outside air suction port opening from the front engine compartment to the outside of the vehicle,
the blower sucks the air flow through the outside air suction port and blows out the sucked air flow,
in the duct, the air flow blown out from the blower is pushed into the first opening portion, and the pushed air flow is blown from the second opening portion to the object to be cooled.

8. A cooling module applied to a vehicle having a blower arranged on a front side in a vehicle traveling direction with respect to a driving engine in a front engine compartment, comprising:
a duct having a first opening portion and a second opening portion so as to form an air flow between the first opening portion and the second opening portion, wherein the first opening portion opens to the front side in the vehicle traveling direction with respect to the driving engine in the front engine compartment and the second opening portion opens to an object to be cooled in the front engine compartment other than the driving engine;
a transition determination unit configured to determine whether or not the driving engine is shifted from an operating state to a stopped state;
a temperature determination unit configured to determine whether or not the temperature of the object to be cooled is higher than a threshold value based on a detected value of a temperature detection unit that detects a temperature of the object to be cooled; and
a control unit configured to control the blower so that the air flow pushed into the duct from the first opening portion is blown out to the object to be cooled from the second opening portion, when the transition determination unit determines that the driving engine is shifted from the operating state to the stopped state and the temperature determination unit determines that the temperature of the object to be cooled is higher than a threshold value, wherein
in the duct the air flow blown out from the blower is pushed into the first opening portion and the pushed air flow is blown out from the second opening portion to the object to be cooled,
the blower has a fan configured to generate an air flow by rotation and a drive unit configured to rotate the fan, and
the control unit includes a first control section that controls the drive unit so as to rotate the fan to one side in the rotation direction so that the air flow pushed into the duct from the first opening portion is blown out from the second opening portion to the object to be cooled,
the cooling module, further comprising
an operation determination unit configured to determine whether the driving engine is in an operating state or not, and
a second control unit configured to blow out the air flow which passes through the fan from the front side in the vehicle traveling direction, to the driving engine by controlling the drive unit so as to rotate the fan to the other side in the rotation direction, when the operation determination unit determines that the driving engine is in an operating state.

9. A cooling module applied to a vehicle having a blower arranged on a front side in a vehicle traveling direction with respect to a driving engine in a front engine compartment, and an introduction flow passage configured to allow an air flow to flow between a front opening portion that opens the front engine compartment in the front side in the vehicle traveling direction and the blower, comprising:
a duct having a first opening portion and a second opening portion so as to form an air flow between the first opening portion and the second opening portion, wherein the first opening portion opens to the front side in the vehicle traveling direction with respect to the driving engine in the front engine compartment and the second opening portion opens to an object to be cooled in the front engine compartment other than the driving engine, and a shutter configured to open and close the introduction flow passage, wherein in the duct the air flow blown out from the blower is pushed into the first opening portion and the pushed air flow is blown out from the second opening portion to the object to be cooled, the first opening portion of the duct is positioned on the side of the blower with respect to the shutter in the introduction flow passage, and in a state where the shutter closes the introduction flow passage, in the duct, the air flow blown out from the blower is pushed into the first opening portion, and the pushed air flow is blown out from the second opening portion to the object to be cooled.

10. A cooling module applied to a vehicle having a blower arranged on a front side in a vehicle traveling direction with respect to a driving engine in a front engine compartment, a radiator for cooling a cooling water of the driving engine disposed on a front side in the vehicle traveling direction of the blower, and an outside air suction port opening from the front engine compartment to the outside of the vehicle so as to introduce air between the blower and the driving engine without passing through the radiator, comprising:

a duct having a first opening portion and a second opening portion so as to form an air flow between the first opening portion and the second opening portion, wherein the first opening portion opens to the front side in the vehicle traveling direction with respect to the driving engine in the front engine compartment and the second opening portion opens to an object to be cooled in the front engine compartment other than the driving engine, and wherein the blower sucks the air flow through the outside air suction port and blows out the sucked air flow, and in the duct the air flow blown out from the blower is pushed into the first opening portion and the pushed air flow is blown out from the second opening portion to the object to be cooled.

* * * * *